United States Patent [19]

Nilsson

[11] 3,894,469

[45] July 15, 1975

[54] FASTENER

[75] Inventor: John Edgar Nilsson, Ljungskile, Sweden

[73] Assignee: Nordisk Kartro Aktiebolag, Sweden

[22] Filed: Jan. 5, 1973

[21] Appl. No.: 321,446

[52] U.S. Cl. .............................. 85/79; 85/23; 85/21
[51] Int. Cl. ............................................. F16b 13/04
[58] Field of Search .............. 85/72, 79, 23, 26, 21, 85/31, 63, 66, 10 F, 8.1, 8.3, DIG. 2; 151/14.5

[56] References Cited
UNITED STATES PATENTS

| | | | |
|---|---|---|---|
| 1,060,543 | 4/1913 | Evans | 85/23 |
| 1,417,818 | 5/1922 | Frost | 85/23 |
| 1,798,273 | 3/1931 | Pleister | 85/23 |
| 1,829,974 | 11/1931 | Williams | 85/10 F |
| 2,196,144 | 4/1940 | Eckler | 85/21 |
| 2,243,157 | 5/1941 | Huggins | 85/31 |
| 2,355,955 | 8/1944 | Cummings | 85/31 |
| 2,376,936 | 5/1945 | Pfeffer | 85/23 |
| 2,474,281 | 6/1949 | Ruiz | 85/26 |
| 2,502,267 | 3/1950 | McPherson | 85/23 |
| 2,988,854 | 6/1961 | McKinley | 85/31 |
| 3,076,373 | 2/1963 | Matthews | 85/23 |
| 3,112,667 | 12/1963 | Brentlinger | 85/21 |
| 3,322,446 | 5/1967 | Koziol et al. | 151/14.5 |
| 3,485,132 | 12/1969 | Hanny et al. | 85/10 F |

FOREIGN PATENTS OR APPLICATIONS

| | | | |
|---|---|---|---|
| 1,212,248 | 10/1959 | France | 85/31 |
| 471,134 | 2/1929 | Germany | 85/21 |

*Primary Examiner*—Marion Parsons, Jr.
*Attorney, Agent, or Firm*—Hill, Gross, Simpson, Van Santen, Steadman, Chiara & Simpson

[57] ABSTRACT

A fastener such as a nail for being forced into a pre-bored hole in concrete or other hard material has a yieldable, i.e. a deformable or breakable weakened portion joining a front and a rear part of the fastener. When during the driving of the fastener the tip of the front part is arrested, continued driving of the fastener causes deformation or breaking of the weakened portion and resultant wedging of the adjacent portion of the rear shank part against the wall of the hole.

3 Claims, 5 Drawing Figures

3,894,469

FASTENER

BACKGROUND OF THE INVENTION

1. Field of the Invention

This invention relates to fasteners of the type having a shank adapted to be anchored in hard material, such as concrete. The invention is particularly useful for nails and will be described with particular reference to its application to nails, although it should be noted that it is not so limited.

2. Prior Art

Fasteners such as cement nails are known in the art and may have round or square cross sections. Frequently and customarily, they are employed with a dowel in a preformed hole, and certain forms thereof lack the ability to be removed.

SUMMARY OF THE INVENTION

According to this invention, a fastener has a shank portion that is receivable in an opening, the shank having recessing which provides a weakened portion adapted to be displaced laterally into engagement with the materials surrounding the shank after the front or entrant end portion of the shank has been arrested.

According to one aspect of the invention, wedge faces directly engage each other and urge circumferential flanges on the rear end portion firmly against such materials.

Accordingly, the principal object of the invention is to provide a nail which has very good holding power, which is simple and can be manufactured at low cost, and which is as simple to use as an ordinary nail.

This and other objects, features and advantages of the invention will be apparent from the following description of preferred embodiments of the invention as illustrated in the accompanying drawings.

ON THE DRAWINGS

AS SHOWN ON THE DRAWINGS

Figure 1:
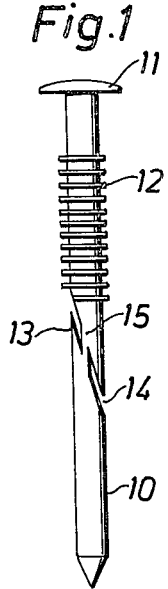
FIG. 1 is an elevational view of a nail embodying the invention and particularly intended for nailing boards, e.g. skirting boards, to concrete walls.

The nail shown in FIG. 1 has a shank 10 and a head 11 like an ordinary wire nail. The shank may be circular or non-circular in cross-section and has serrations or flanges 12 over a portion of its length. The head 11 may take different shapes and may also be combined with or constitute a clip for holding electric cables, for example.

The nail shank 10 is recessed to provide a weakened portion which comprises two aligned and opposite, oblique slots 13,14 separated by a relatively weak ligament 15. The slots 13,14 may be formed in any suitable manner, e.g. by milling or by cutting by means of a knife-like edge tool.

Figure 2:
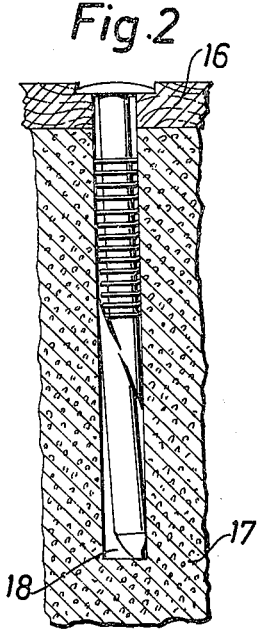
FIG. 2 is a sectional view showing the nail of FIG. 1 driven into a pre-formed blind hole in a concrete wall to hold a skirting board to the wall.

As shown in FIG. 2, the nail shown in FIG. 1 is intended to be used as follows: When a skirting board 16, for example, is to be secured to a concrete wall 17, a hole 18 is first bored through the skirting board to a predetermined depth in the wall. Then the nail is driven into the hole 18, without first inserting a dowel into the hole as has hitherto been the customary practice. When the tip of the nail engages the bottom of the hole 18, the front part of the nail is stayed thereby with the rear part or head still protruding from the skirting board 16. Continued driving of the nail by blows on the head 11 causes the ligament 15 to break or deform so that the shank end faces constituting the walls of the slots 13,14 start to slide on each other. As shown in FIG. 2, the result is a wedging action causing the rear part of the nail to be clamped to the wall of the hole 18. The serrations 12 are pressed into the wall of the hole 18 and thereby increase the withdrawal resistance of the nail, but the withdrawal resistance is primarily due to the wedging action.

The fundamental principle is that when the front of the nail is stayed with a portion of the rear part of the nail still protruding, continued driving of the nail causes at least a portion of the shank adjacent to a recess to be displaced laterally into firm engagement with the material surrounding the shank. This fundamental principle can be built in several different embodiments.

Thus, one of the slots 13,14 may be omitted leaving a ligament at one side of the shank. Moreover, the nail need not have a pointed tip as shown in FIG. 1 but may have a blunt or rounded tip.

Figure 3:
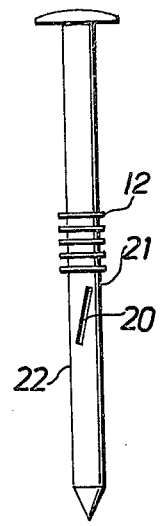
FIGS. 3 to 5 are elevational views of three further nails embodying the invention, a portion of FIG. 5 being in cross-section.

In the embodiment shown in FIG. 3, the recessing that provides the weakened portion comprises a single central slot 20 leaving at the ends thereof two ligaments 21,22 joining the front and rear part of the shank. In this embodiment, there is less likelihood than in the embodiment shown in FIG. 1 of accidental bending of the nail during transport and in use. In both embodiments, the angle of the slots 13,14 and 20 to the axis of the shank, as well as the width of the slots and the dimensions of the ligaments, are chosen in dependence on the particulars of each application. In some applications the dimensions of the ligaments may be so chosen that the ligaments are not broken, but only deformed, during the final phase of the driving of the nail. The front part of the shank too can then be withdrawn if desired, and thus the entire nail can be reused. This may be advantageous in the case of some types of fasteners, such as clamps for electric cables.

Figure 4:
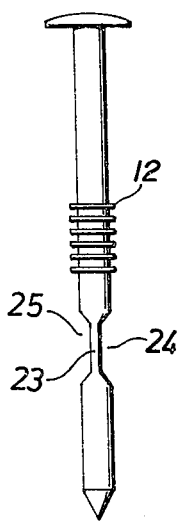

The embodiment shown in FIG. 4 differs from the above-described embodiments in that the recessing that provides the weakened portion comprises two opposite depressions 24,25 in the shank separated by a ligament 23. The ligament 23 is dimensioned to enable the front part of the shank to be skewed in the inner portion of the hole into which the nail is driven whereupon the ligament will keep that part in the skewed position in firm engagement with the wall of the hole. The ligament 23 may also be made relatively long. As a result, in addition to the anchoring effect of the skewed front part of the shank, the ligament itself will be deformed in such a manner that at least portions thereof will provide an anchoring effect. The depressions 24,25 may be formed in any suitable manner, such as by rolling the sides of the shank or by milling. In some cases one of the depressions 24 or 25 may be omitted.

Figure 5:
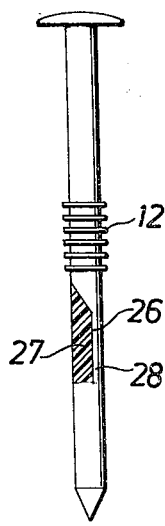

In the embodiment shown in FIG. 5, the recessing that provides the weakened portion comprises a depression 26. The depression 26 is filled with a compound 27 of plastic or other suitable material. The rear end of the depression is inclined at a rather steep angle, e.g. about 45 degrees, to a plane transverse to the axis of the nail shank. During the final phase of the driving of the nail, the ligament 28 interconnecting the front and rear shank parts is deformed so that the volume of the depression 26 is substantially reduced. As a result, the compound 27 is displaced, and more particularly, owing to the inclination of the end wall of the depression 26, to a greater degree towards the head of the nail than towards the bottom of the hole. The outer part of the shank, therefore, will be anchored in the compound 27 which fills the space between the nail and the wall of the hole, at least in the region where the serrations 12 are provided.

It has been assumed above that the nails are to be driven into prebored holes having a depth that corresponds at least roughly to a predetermined value.

In the embodiment of FIG. 6, the plastic compound 27 normally is of the thermosetting type. The compound may also be a composite material, namely, a thermosetting resin combined with a setting agent that is released only when the compound is displaced into the space between the nail and the wall of the hole.

Several modifications and changes of details, in addition to those described above, may be made without departing from the spirit and scope of the invention.

I claim as my invention:

1. A fastener comprising a shank having a front end adapted to be driven into a holding structure and a rear end having a head, said shank having four flat parallel wedge faces defining two slots extending obliquely from opposite sides of the shank toward the axis of the shank, and a yieldable ligament extending parallel to said axis, interconnecting said wedge faces, and joining said front and rear ends of the shank, one wedge face of each of said slots being disposed in a common plane, and the other wedge face of each of said slots being disposed in a second common plane.

2. A fastener according to claim 1 including a series of axially spaced circumferential flanges disposed on the rear end of said shank for being shifted in one radial direction by interaction between the confronting wedge faces.

3. A fastener according to claim 2 in which said flanges have oppositely facing flat surfaces.

* * * * *